(12) United States Patent
Asano et al.

(10) Patent No.: US 6,246,359 B1
(45) Date of Patent: Jun. 12, 2001

(54) RADAR

(75) Inventors: Yoshikazu Asano; Shigeki Ohshima, both of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/380,065

(22) PCT Filed: Dec. 25, 1998

(86) PCT No.: PCT/JP98/05904

§ 371 Date: Aug. 25, 1999

§ 102(e) Date: Aug. 25, 1999

(87) PCT Pub. No.: WO99/34234

PCT Pub. Date: Jul. 8, 1999

(30) Foreign Application Priority Data

Dec. 25, 1997 (JP) .................................................. 9-358348

(51) Int. Cl.$^7$ ...................................................... G01S 13/06
(52) U.S. Cl. ............... 342/158; 342/70; 342/118; 342/127; 342/128; 342/133; 342/147; 342/195
(58) Field of Search .................................. 342/147–158, 342/194, 195, 417–449, 70–72, 118–134, 374

(56) References Cited

U.S. PATENT DOCUMENTS

| | | |
|---|---|---|
| 3,618,090 * | 11/1971 | Garrison ............................... 342/147 |
| 3,885,237 | 5/1975 | Kirkpatrick . |
| 4,123,759 * | 10/1978 | Hines et al. .......................... 342/374 |
| 4,160,974 | 7/1979 | Stavis . |
| 4,313,117 * | 1/1982 | Lipsky ................................. 342/437 |
| 4,336,540 * | 6/1982 | Goodwin et al. ..................... 342/157 |
| 4,532,515 * | 7/1985 | Cantrell et al. ...................... 342/147 |
| 5,815,112 | 9/1998 | Sasaki et al. . |

FOREIGN PATENT DOCUMENTS

| | | |
|---|---|---|
| 4-310887 | 11/1992 | (JP) . |
| 5-34446 | 2/1993 | (JP) . |
| 7-113862 | 5/1995 | (JP) . |

OTHER PUBLICATIONS

W. Holpp, NTZ Archiv. vol. 11, No. 4, pp. 165–174, "Radar–Und Radiometer–Sensoren Immillimeterwellen–Bereich," 1989; Berlin, West Germany.

SAE International Congress and Exposition, 1987, Feb. 23–27 Cobo Hall, Detroit, Michigan "Application of Radar for Automotive Crash Avoidance", Christopher L. Lichtenberg (pp. 35&79–85).

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A signal processing unit detects the azimuthal direction of a target in accordance with the phase difference between signals received by two receiving antennas. Then, by sequentially switching plural transmitting antennas having mutually different beam directions with a switching device, received signals are obtained using each of the transmitting antennas.

5 Claims, 4 Drawing Sheets

RADAR

TECHNICAL FIELD

The prevent invention relates generally to a radar device for detecting the azimuthal direction of a target on the basis of the signal reflected from the target and received by the plural receiving antennas, and more particularly to the radar device in which the plural transmitting antennas are sequentially switched.

BACKGROUND ART

Various types of radar have conventionally been used to detect the relative distance and relative speed of a target. For example, radar is commonly used to detect the relative distance and relative speed of a lead-vehicle on a road. One type of radar used for this purpose is a phase monopulse radar. In a phase monopulse radar, a plurality of receiving antennas receive reflected waves from a target obtained by sending radio waves from one transmitting antenna. Because the receiving antennas have different spatial positions, even signals reflected from the same target differ in phase. The azimuthal direction of the target can then be detected by detecting this phase shift. In principle, this phase monopulse radar has an advantage in that the sending and receiving antennas need not be physically moved.

However, using a phase monopulse radar does result in the generation of ambiguities. Specifically, in the phase monopulse method, as shown in FIG. 1, the azimuthal direction θ of a target is obtained from the phase difference Δϕ of a signal (wavelength: λ) received by two receiving antennas (assume the interval is L) in accordance with the following formula:

$$\theta = (180/\pi)\sin^{-1}\{(\Delta\phi/360)\cdot(\lambda/L)\}$$

When Δϕ satisfies −180 degrees<Δϕ≦+180 degrees, a unique value for the azimuthal direction θ of the target can be obtained. However, when the receiving antennas have wide directional beams and the distance L between the receiving antennas is long, the value of the phase difference may be beyond this range. Therefore, a phase difference can only be detected within a practical range of −180 to +180 degrees: Δϕ and Δϕ+360 degrees, for example, cannot be discriminated.

Accordingly, when the azimuthal directions of the two targets are θ1 and θ2, respectively, and the phase difference Δϕ1 that corresponds to θ1 is within the above range while the phase difference Δϕ2 that corresponds to θ2 is beyond the range, as shown in FIG. 2, although the azimuthal direction $\theta_{1det}$ to be detected regarding θ1 is correct, the azimuthal direction $\theta_{2det}$ detected regarding θ2 will differ from the original azimuthal direction. This is what is meant by ambiguity.

In other words, when the phase shift exceeds this range, the detected azimuthal direction will differ from the true azimuthal direction. For example, if a phase monopulse radar is mounted on a vehicle and used to detect an advancing vehicle, a non-existent advancing vehicle may be incorrectly detected.

In an attempt to prevent this, a phase monopulse radar commonly only operates within a range where no ambiguity problems occur.

Another type of monopulse radar is an amplitude monopulse radar. Amplitude monopulse radar receives signals reflected from a target by a plurality of receiving antennas with different beam directions. The azimuthal direction of the target is then detected in accordance with the amplitude of the waves received by the receiving antennas. For example, if the amplitudes of the received waves received by two receiving antennas are the same, the azimuthal direction of the target is determined to be in the middle between directions of the signals, and the azimuthal direction of the target is determined from difference of the amplitude between the received waves.

Such an amplitude monopulse antenna also has a theoretical advantage in that the transmitting antenna and the receiving antennas need not be physically moved. However, operation of an amplitude monopulse antenna requires assuming that multiple targets having the same distance and speed does not exist. In other words, if waves reflected from a plurality of targets are received, these signals cannot be discriminated. Accordingly, the amplitude monopulse antenna is used only for detecting the azimuthal direction of a target in rather a narrow angle of visibility and only in the case of a single target.

It is therefore an object of the present invention to provide radar device that can accurately detect the azimuthal direction of a target using a combination of the phase and amplitude monopulse methods.

DISCLOSURE OF THE INVENTION

The present invention comprises plural transmitting antennas with mutually different directional beam directions. These antennas are sequentially switched and the radio waves they radiate, are received by a plurality of receiving antennas after the waves are reflected from a target with reference to the radio waves radiated from these plural transmitting antennas. Also included is an azimuthal direction detection device for detecting the azimuthal direction of the target based on the phase difference or amplitude difference between the waves received in the plurality of receiving antennas.

In this manner, more information is obtained by receiving through the plural receiving antennas the reflected waves from the target that are based on the waves sent from the plural transmitting antennas, than in a radar device where only a single transmitting antenna is used. In the present apparatus, the azimuthal direction of the target can then be accurately determined based on this information.

It may be preferable for the final azimuthal direction detection device to detect the azimuthal direction of the target detected based on the phase difference or amplitude difference between the received waves in the plurality of receiving antennas and the azimuthal direction of the target based on the azimuthal direction of the beam when this target azimuthal direction was detected. For example, the amplitude monopulse antenna may obtain two received signals when a single receiving antenna receives reflected waves originating from two transmitting antennas having differing beam azimuthal directions. The azimuthal direction of the target can then be determined from the amplitude difference of the two received signals and the azimuthal direction of the directional beam. The two received signals are also obtained by receiving the reflected waves that are based on the radio waves from a single transmitting antenna by the two receiving antennas having a different beam azimuthal direction. The azimuthal direction of the target can also be detected from the amplitude difference of the two received signals and the azimuthal direction of the directional beam.

It may also be preferable that the azimuthal direction detection device should further detect the final target azimuthal direction in consideration of the width of the direction beam. Moreover, it may be preferable that the azimuthal direction detection device should output the final target azimuthal direction when the azimuthal direction of the target detected based on the phase difference or amplitude difference between the received waves in the plurality of receiving antennas be contained in the radiation azimuthal direction range of the radio waves determined depending on the azimuthal direction of the directional beam and the width of the directional beam when the azimuthal direction of the target was detected.

Further, it may also be preferable that the azimuthal direction detection device should detect the azimuthal direction of the target based on the phase difference between waves received by a plurality of receiving antennas and comprise a decision devices for deciding that the target is true when the azimuthal direction of the detected target almost coincides with the azimuthal direction indicated by the target that was detected by radiating radio waves from the transmitting antenna having a directional beam azimuthal direction approximate to the azimuthal direction.

The plurality of transmitting antennas are switched and used in this manner. Then, when it is determined that a target is at a position where the phase is largely shifted so that it is ambiguous as to whether or not the detected target actually exists, a determination is made according to whether or not the target is detected in the detection for which another transmitting antenna is used. This uncovers incorrect detection due to ambiguity and allows accurate target determination with phase monopulse radar.

Furthermore, it may also be preferable for the azimuthal direction detection device to determine the azimuthal direction of a detected target according to the phase difference or amplitude difference and the final target azimuthal direction by adding the azimuthal direction of a directional beam when the azimuthal direction of the target was detected. The target azimuthal direction detected based on the phase difference or amplitude difference in plural receiving antennas indicates the interval from the azimuthal direction (detection region center) of the directional beam in plural receiving antennas at that time. Accordingly, the azimuthal direction of the final target can be obtained by adding the azimuthal direction of the detection region center to the obtained azimuthal direction. This allows the detection region of the azimuthal direction to be extended.

For example, in a phase monopulse antenna, although two receiving antennas may detect the azimuthal direction from the received phase difference, the range of the azimuthal direction to be detected can also be varied using a receiving antenna with a different a directional beam. In such a case, the center of the directional beam should be set to azimuthal direction 0. Then, detection in which each transmitting antenna is used can be performed from the phase difference $-\pi$ to $\pi$ and the generation of ambiguities can be prevented by adjusting the directional beam width of each transmitting antenna so that the phase difference in the received signal will be inserted between $-\pi$ and $\pi$. Subsequently, the azimuthal direction of real targets can be determined by adding the direction of the directional beam of the transmitting antenna after the azimuthal direction has been detected.

It may still further be preferable that that the radar device of the present invention should be mounted on a vehicle and used to detect lead-vehicles; that not only the azimuthal direction of the target but also its distance and speed should be detected with extremely high-frequency radio wave (millimeter wave) radiated from a transmitting antenna and received by a receiving antenna; and that these azimuthal direction, distance, and speed be detected on the basis of the frequency analysis of a baseband signal given by the coherent detection of the received signal and the analysis should be done digitally processing after A/D conversion.

DESCRIPTION OF SYMBOLS

1. Control Unit, 2. FMCW Source 3. Power Divider, 4. Switching Device, 5. Transmitting Antenna, 6. Receiving antenna, 7a, 7b. Amplifier, 8a, 8b. Detector, 9a, 9d. A/D Converter, 10. Signal Processing Unit

BEST MODE FOR CARRYING OUT THE INVENTION

The preferred embodiments of the present invention are described below with reference to the attached drawings.
"First Embodiment"

Figure 3:
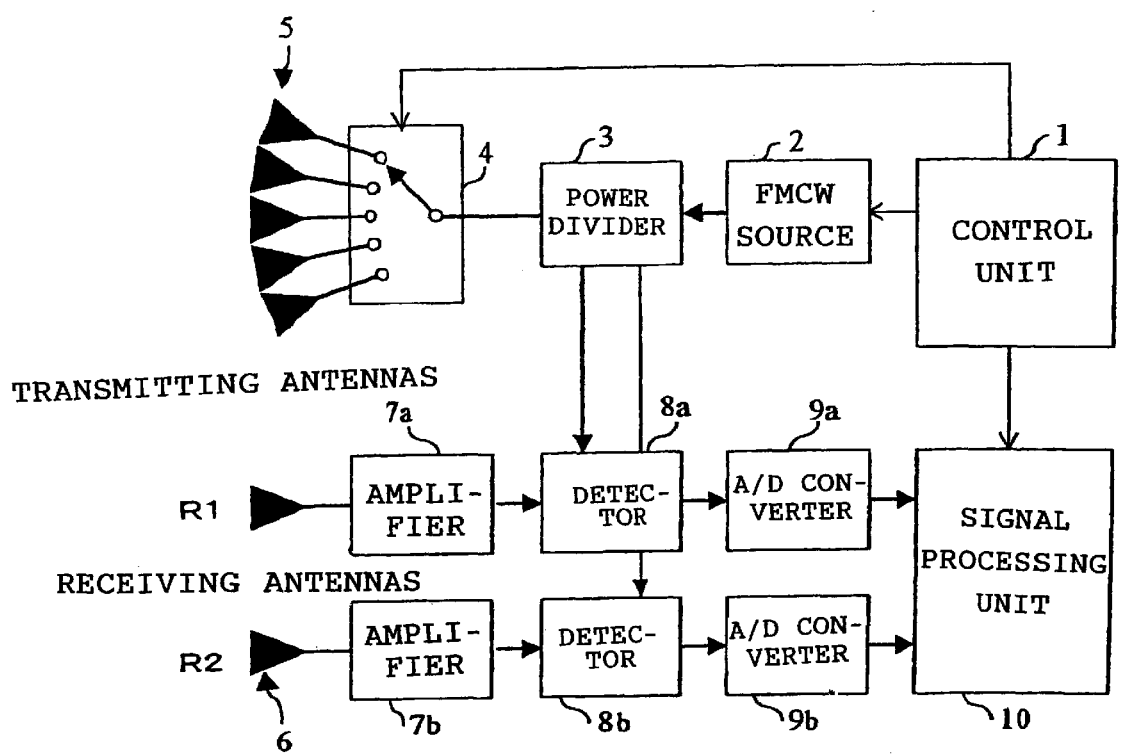
FIG. 3 is a block diagram showing the configuration of a first embodiment of the present invention.

FIG. 3 outlines a configuration of a radar device according to a first embodiment of the present invention. A control unit 1 controls transmission of a radio wave and signal processing of a received signal. An FMCW source 2 is connected to this control unit 1, and this FMCW source 2 generates a high-frequency wave that was frequency-modulated by a triangular wave in accordance with the control of the control unit 1. For example, the FMCW source 2 may consist of a voltage-controlled oscillator (VCO), and the high-frequency wave that was frequency-modulated by the triangular wave is generated from the FMCW source 2 by supplying a triangular wave in which the voltage increases or decreases depending on the time from the control unit 1. The high-frequency wave from the FMCW source 2 is distributed into three by a power devider 3 and one of the three is supplied to a switching device 4. A plurality of transmitting antennas 5 in which the azimuthal direction of a directional beam differs mutually are connected to this switching device 4. In this example, the five transmitting antennas 5 are connected to the switching device 4. Accordingly, the high-frequency wave that was frequency-modulated by the triangular wave output from the FMCW source 2 is radiated from the one transmitting antenna 5 selected in the switching device 4 as radio waves. The directivity of the sending beam is switched by switching the transmitting antenna 5 using the switching device 4.

The radio waves radiated from the transmitting antenna 5 are received by an antenna 6 (R1 or R2). This receiving antenna 6 consists of the two receiving antennas 6 (R1 and R2) spatially arranged at a predetermined interval. Detectors 8a and 8b are connected to these receiving antennas 6 (R1 and R2) through amplifiers 7a and 7b that amplify received radio waves, respectively. The high-frequency wave that was frequency-modulated by the triangular wave is supplied from the power divider 3 to these detectors 8a and 8b as reference waves. These detectors 8a and 8b mix and synchronously detect the received waves and the reference waves and convert them to baseband signals.

A/D converters 9a and 9b are connected to the detectors 8a and 8b and the baseband signals obtained in the detectors 8a and 8b are converted to digital signals. The digital signals are then supplied to a signal processing unit 10. The signal processing unit 10 Fourier-transforms the supplied digital signals and obtains data on the signal frequency component. For the frequency component having the prescribed amplitude, the distance and speed of a target are detected based on the principle of FMCW radar. Phase monopulse processing is then executed to determine azimuthal direction of the target.

In other words, when FMCW radar synchronously detects received waves using reference waves, a beat signal that is based on the difference of both frequencies is obtained. This beat signal consists of a component based on the delay of a received wave that corresponds to the distance of a target and a component based on the Doppler shift that corresponds to the speed of the target. The distance and speed of the target can then be detected by independently obtaining the beat signal in an up phase in which the frequency increases, and in a down phase in which the frequency decreases.

Figure 1:
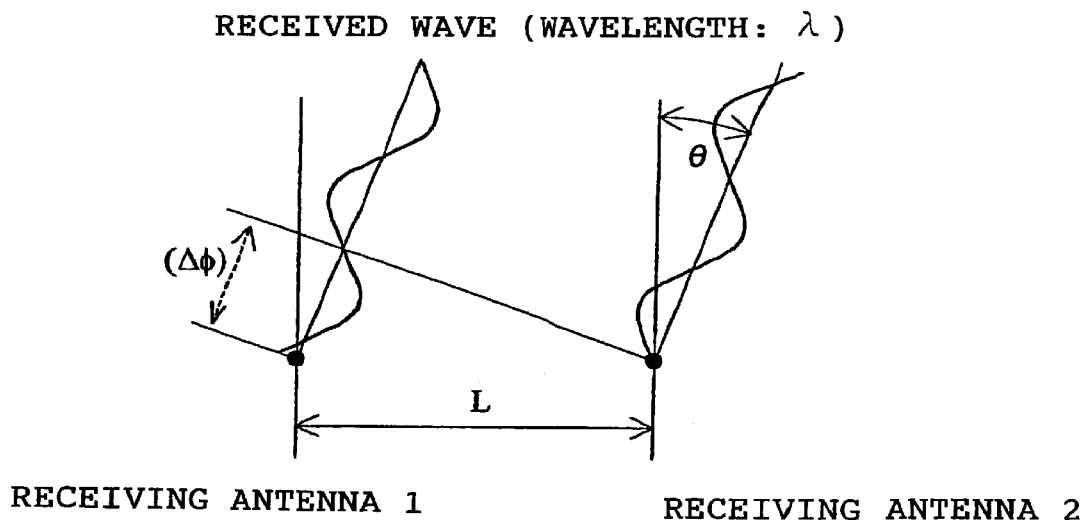
FIG. 1 is a diagram outlining the principle of detecting an azimuthal direction angle using phase monopulse radar.
Figure 2:
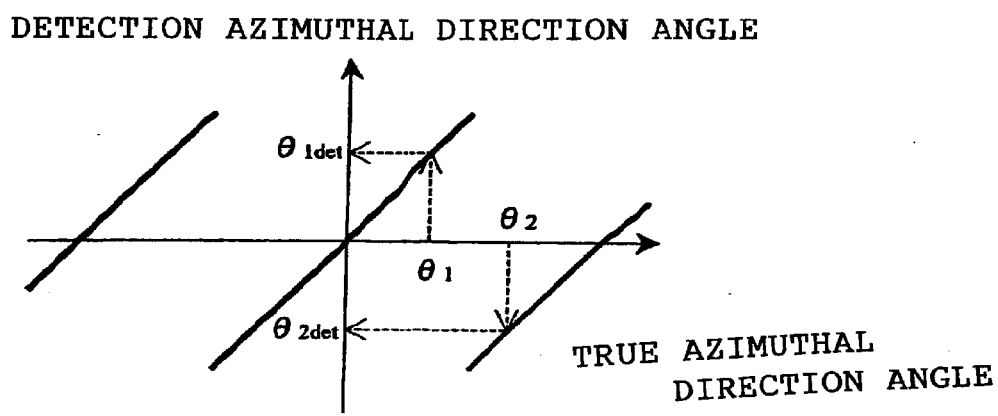
FIG. 2 is a diagram describing ambiguity.

Moreover, by comparing the phase of the baseband signal of a received signal in the two receiving antennas 6 (R1 and R2), the azimuthal direction is obtained from the phase difference. In other words, as shown in FIG. 1, when the phase difference of radio waves received by the two receiving antennas is $\Delta\theta$, the distance of the two receiving antennas is L, and the wavelength of the radio wave is $\lambda$, because the azimuthal direction $\theta$ is expressed as $$\theta = (180/\pi)\sin^{-1}\{(\Delta\phi/360)\cdot(\lambda/L)\},$$

the azimuthal direction of the target can be detected by detecting the phase difference.

The control unit 1 controls this series of processing by sequentially switching the switching device 4 and switching the transmitting antenna so that processing can be executed repeatedly.

Figure 4:
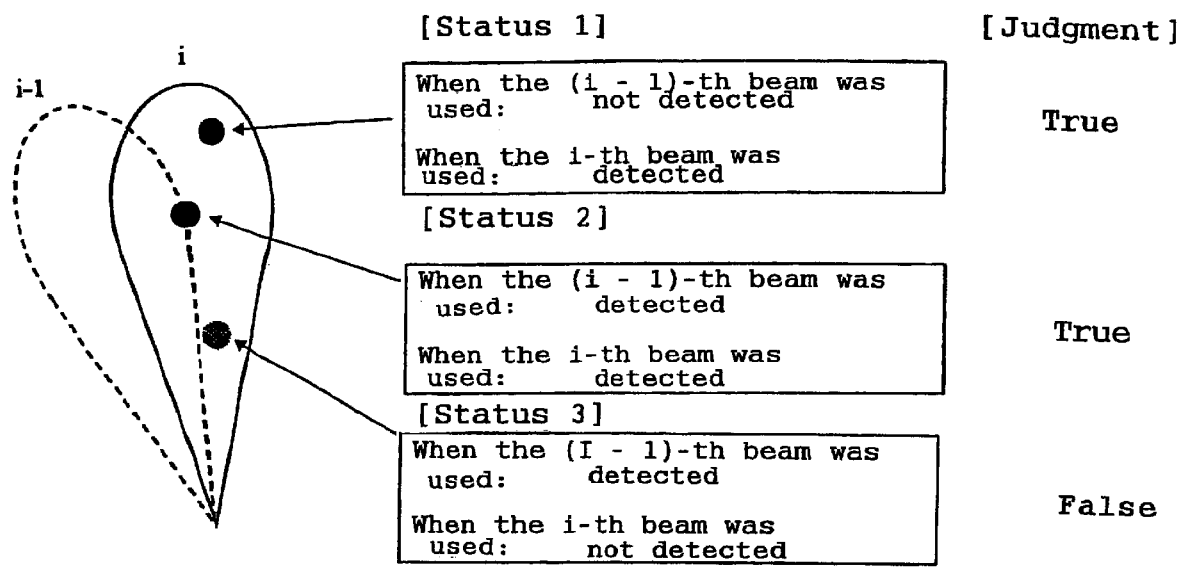
FIG. 4 is a diagram for describing the decision of the truth or falsehood for a detected target.

In this embodiment, the signal processing unit 10 decides whether or not the target detected in the detected azimuthal direction is a true target, as described above. FIG. 4 shows an algorithm for deciding whether or not the detected target is the true target when a high-frequency beam was radiated from the (i–1)-th and i-th antennas of the transmitting antenna 5.

[Status 1] shows a case where the target is not detected when the (i–1)-th beam is radiated, but is detected almost in the beam direction when the i-th beam was radiated. In this case, the detected target is decided to be true from the receiving result for the two sending beams.

Next, [Status 2] shows a case where both of the transmitting antennas 5 detect the target, and wherein the differences of the detected distance, speed, and azimuthal direction are below predetermined thresholds $\epsilon_R$, $\epsilon_V$, and $\epsilon_{AZ}$ when a high-frequency beam was radiated from the (i–1)-th and i-th transmitting antennas 5. In such a case, the same true target is judged to have been detected by the reflected waves based on the sending beams from the two transmitting antennas 5 and is decided to be a true target. Further, when the difference based on the comparison result is larger than any one of the thresholds $\epsilon_R$, $\epsilon_V$, and $\epsilon_{AZ}$, the target is judged to be another target candidate and the judgment conforms to the judgment of [Status 1] or [Status 3].

[Status 3] shows a case where the target is detected when the (i–1)-th beam was radiated, but is not detected when the i-th beam was radiated and the case where it must be detected when the i-th beam was radiated from the detection result when the (i–1)-th beam was radiated. In such a case, the target when the (i–1)-th beam was radiated originates in ambiguity and is determined to be a false target.

In this manner, in this embodiment, the truth or falsehood of the detected target is decided from the receiving result when radio waves were radiated from another transmitting antenna. This effectively eliminates incorrect recognition of the target stemming from ambiguity. Additionally, it may be preferable when determining the truth or falsehood of a target detected when the radio waves are radiated from a single transmitting antenna, that the detection result for the transmitting antenna having a beam direction located nearest, or near, the detected target in accordance with the detection position of the target be referenced. Further, when a plurality of transmitting antennas are provided, in the transmitting antenna located at the end, there is no transmitting antenna that can be used to verify truth or falsehood for the detected target at the half on the end side. Accordingly, it is preferable that the detection result regarding this portion also be ignored. It is also preferable the detection result be stored as time series data and that the generation of ambiguity be detected based on the movement of the target.

In particular, the azimuthal direction angle where ambiguity occurs when radio waves were radiated from the respective transmitting antennas is forecast from the interval of receiving antennas and the wavelengths of the radio waves used. By making the beam of the transmitting antenna differ at every appropriate angle, false targets can be detected with certainty when there is a transmitting antenna in an adjacent direction.

As described above, in the present embodiment, phase monopulse radar is used by switching among a plurality of transmitting antennas. Thus, a larger amount of information is obtained as compared with the case where one transmitting antenna was used by receiving the reflected waves from the target that are based on the waves sent from plural transmitting antennas. With this information, the azimuthal direction of the target can be accurately detected.

In other words, if the target is at a position where the phase is largely shifted so as to cause ambiguity, the target is decided according to whether or not the target is detected in the detection for which another transmitting antenna was used. This decides incorrect detection caused by ambiguity and allows a target to be accurately detected using phase monopulse radar.

"Second Embodiment"

The configuration of a RADAR DEVICE according to a second embodiment of the present invention is similar to that described above for RADAR DEVICE the first embodiment. Although in the following description, the transmitting antenna 5 consists of three antennas T1, T2, and T3, it is acceptable that the number of antennas be any number greater than one. Further, the directivity of the receiving antennas may differ, though in such a case correction due is necessary. In the following description, the directivity of the two receiving antennas shall, in principle, be equal.

Figure 5:
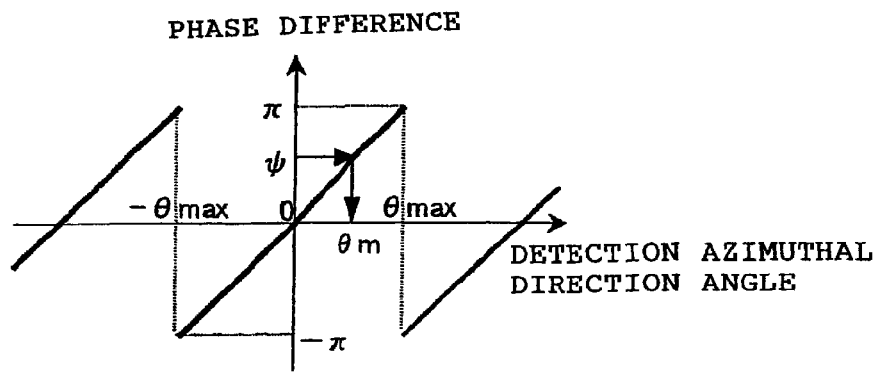
FIG. 5 is a diagram showing the relationship between the direction of a detected azimuthal direction angle and a phase difference.

The relationship between the phase difference and azimuthal direction of the two received signals in the two receiving antennas 6 (R1 and R2) is shown in FIG. 5. The detectable phase difference is $-\pi$ ($-180$ degrees) to $\pi$ ($180$ degrees), and $-\theta$max to $\theta$max that correspond to this phase difference $\psi$ become the range where the azimuthal direction can be detected without being affected by ambiguity.

Further, assume that the beam directions (azimuthal direction angles) of the transmitting antennas 5 (T1, T2, and T3)

are θ, 0, and −θ in the same manner as the first embodiment. When using the three transmitting antennas 5 (T1, T2, and T3), a received signal is corrected so that the phase difference detected in the beam direction of each of the transmitting antennas (T1, T2, and T3) will be 0. In other words, when using any one of the transmitting antennas 5, the received signal is corrected so that the target in the center direction of the beam will be the phase difference 0 in the received signal. This correction can be digitally executed in the signal processing unit 10.

Furthermore, in the following description, the azimuthal direction detection range (radio wave radiation region) in each sending beam is below ±θ max centered around each beam direction. This can be set arbitrarily by adjusting the interval of the receiving antennas 6 (R1 and R2).

Consequently, the phase difference ψ to be detected ranges from −π to π, even when any one of the transmitting antennas 5 is used, if the target exists in the radiation region of the sending beam. Accordingly, a wide range of detection can be carried out without being affected by ambiguity.

Further, when those transmitting antennas 5 by which a comparatively strong radio wave is radiated not only in the radio wave radiation region that is determined from the directivity of the adjacent transmitting antennas 5 (T1, T2, and T3), but also in the outside are used, an azimuthal direction detection error can be prevented by setting θmax to a large value compared with the radio wave radiation region. Conversely, if an antenna that radiates only in the radiation region is used, the radiation region can be set to ±θmax. In such a case, the received signal described previously need not be corrected because the characteristic shown in FIG. 5 has the property of being repeated every twice θmax and has almost the same characteristic regardless of whether or not the received signal is corrected.

The azimuthal direction obtained in this manner indicates the interval of the azimuthal direction direction from the detection region center. Accordingly, the value in which the azimuthal direction of the detection region center was added to the obtained azimuthal direction becomes the azimuthal direction of the final target. The signal processing unit 10 then carries out this addition and outputs the addition result as the final target azimuthal direction.

"Third Embodiment"

Figure 6:
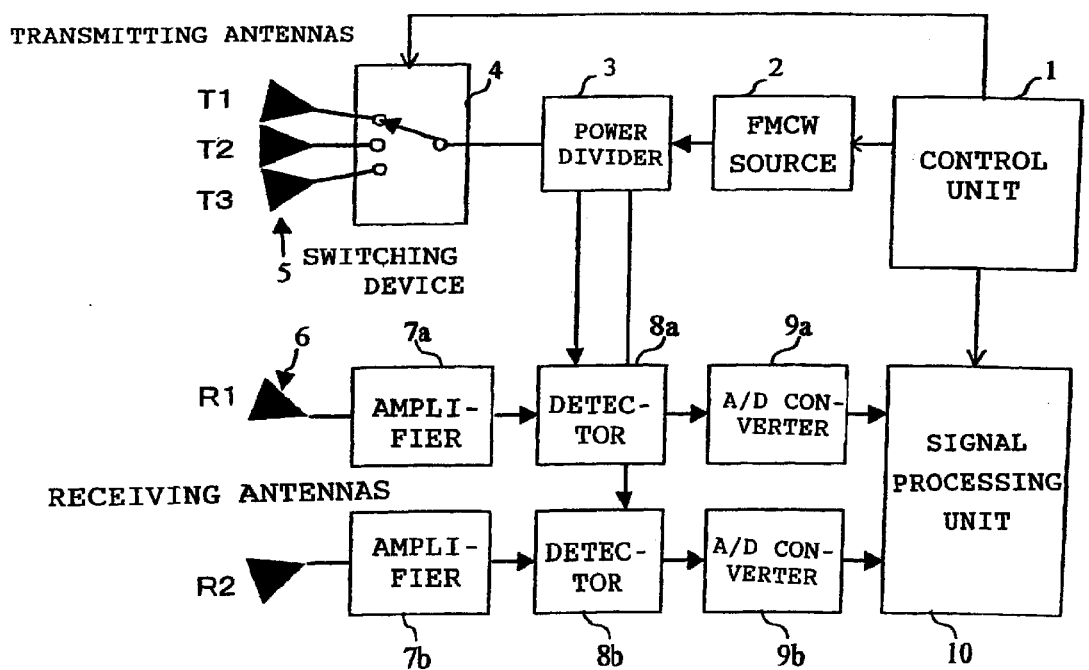
FIG. 6 is a diagram showing the configuration according to a third embodiment of the present invention.

FIG. 6 is a diagram showing the configuration according to a third embodiment of the present invention. The basic configuration is similar to that of the first embodiment described above.

In the radar according to the third embodiment, the receiving antennas 6 (R1 and R2) have different beam directions. The beam of the receiving antenna 6 (R1) points to the direction in which the beam intensities from the adjacent transmitting antennas 5 (T1 and T2) will become equal.

The received signal is mixed with a high-frequency wave from the power divider 3 in the detectors 8a and 8b, detected, and converted to a baseband signal. The baseband signal is then converted to a digital signal in the A/D converters 9a and 9b and Fourier-transformed in the signal processing unit 10. Then, this signal processing unit 10 performs signal processing based on the frequency component having a predetermined amplitude and determines the distance, speed, and azimuthal direction of the target. The control unit 1 sequentially switches the switching device 4 and controls this series of processing so that it can repeated be executed.

In this embodiment, the azimuthal direction is determined based upon the amplitude difference of the received signal. To simplify the description, in the following example the directivity of the transmitting antenna 5 and the receiving antenna 6 are equal and the shape of the beam is symmetrical about the beam direction.

In such a case, assuming that the beam directions (azimuthal direction angles) of the transmitting antennas 5 (T1, T2, and T3) are θ, 0, and −θ, the beam directions of the receiving antennas 6 (R1 and R2) become θ/2 and −θ/2. Hereupon, as shown in Table 1, for an azimuthal direction detection range −θ to 0, the azimuthal direction is determined by comparing the amplitude of the R2 received signal during T3 sending and the R2 received signal during T2 sending. For an azimuthal direction detection range −θ/2 to θ/2, the azimuthal direction is determined by comparing the amplitude of the R1 received signal during T1 sending and the R2 received signal during T2 sending. Further, for the azimuthal direction detection range 0 to θ, the azimuthal direction is determined by comparing the amplitude of the R1 received signal during T2 sending and the R2 received signal during T1 sending.

TABLE 1

| Detection of azimuthal direction | Received signal from which amplitude difference is obtained | |
| --- | --- | --- |
| −θ to 0 | R2 received signal during T3 sending | R2 received signal during T2 sending |
| −θ/2 to θ2 | R1 received signal during T2 sending | R2 received signal during T2 sending |
| 0 to θ | R1 received signal during T2 sending | R1 received signal during T1 sending |

In other words, for the azimuthal direction detection range −θ to 0, the received wave used is one which is a reflection of the radio wave sent from the transmitting antennas 5 (T3 and T2) in one receiving antenna 6 (R2) that points to the direction. For the azimuthal direction detection range −θ/2 to θ/2, the received wave used in the two receiving antennas 6 (R1 and R2) is the reflection of the radio wave sent from the one transmitting antenna 5 (T2) that points to the proper direction. For the azimuthal direction detection range 0 to θ, the received wave that is the reflection of the radio wave sent from the transmitting antennas 5 (T2 and T1) in one receiving antenna 6 (R1) that points to that direction is used.

Thus, in the receiving antennas 6, the amplitude difference (dB difference) between the two received signals is obtained for each azimuthal direction detection region. Accordingly, based on these two received signals, the direction of the reflected wave, that is, the azimuthal direction of the target, can be obtained.

Further, the relationship of this amplitude difference and the azimuthal direction is uniquely determined if the directivity of the antenna is known and is previously stored in the processing signal unit. Moreover, an azimuthal direction value obtained in such a manner indicates the interval of the azimuthal direction direction from the center of the detection region, and the value in which the azimuthal direction of the detection region center was added to the obtained azimuthal direction becomes the azimuthal direction of the final target. Hereupon, the signal processing unit 10 performs such operation and outputs the azimuth of the final target.

Thus, amplitude monopulse type radar can detect the azimuthal direction of a target from the beam directions of plural transmitting antennas. In particular, because different antennas are combined and used in accordance with the azimuthal direction detection region of the receiving antenna, the azimuthal direction can be accurately detected by making one target exist in each region even if there are plural targets ahead.

"Entire System"

The radar device of the present invention is suitable for a device mounted on a vehicle and used to detect the relative distance, relative speed, and azimuthal direction of a lead-vehicle. In this case, the FMCW source generates a high-frequency signal whose frequency periodically increases and decreases and feeds an FMCW to the transmitting antenna through the amplifier. Further, the present invention can also be applied to the pulse radar and the SS radar as well as the FMCW radar. A field of view ahead to some extent is secured by providing plural transmitting antennas having different beam directions and occasionally switching them, as described above.

The signal reflected from the target (lead-vehicle) is then received by two receiving antennas, and the azimuthal direction angle is detected using the phase or amplitude monopulse technique. The relative distance and the relative speed can be independently calculated based on the signals received by both the receiving antennas and more accurate measurements can be produced by using both detection values.

A radar as described above can be mounted on a vehicle to be used for detecting a lead-vehicle, for example.

What is claimed is:

1. A radar device, comprising:
    a plurality of sequentially switchable transmitting antennas having mutually different transmission beam directions configured to radiate a radio wave;
    a plurality of receiving antennas configured to receive signals reflected from a target, with reference to the radio wave radiated from the plurality of transmitting antennas; and
    an azimuthal direction detection device configured to detect an azimuthal direction of the target on the basis of a phase difference or an amplitude difference between the signals received with the plurality of receiving antennas,
    wherein the azimuthal direction detection device includes a decision device configured to determine the azimuthal direction of the target from the phase difference between the signals received with the plural receiving antennas, and configured to decide that the detected azimuthal direction of the target is true when it substantially coincides with the azimuthal direction obtained with radio waves from the transmitting antennas having the transmission beam whose azimuthal direction approximates to the detected azimuthal direction of the target.

2. The radar device according to claim 1,
wherein the azimuthal direction detection device determines a final azimuthal direction on the basis of both the azimuthal direction of the target detected from the phase difference or amplitude difference between the signals received with the plurality of receiving antennas, and an azimuthal direction of the transmission beam when the azimuthal direction of the target was detected.

3. The radar device according to claim 2,
wherein the azimuthal direction detection device further determines the final azimuthal direction of the target according to a width of the transmission beam.

4. The radar device according to claim 3,
wherein the azimuthal direction detection device outputs the final azimuthal direction of the target when the target azimuthal direction detected from the phase difference or amplitude difference between the signals received with the plurality of receiving antennas is included in an azimuthal direction range of the radio wave that is determined according to the direction and width of the transmission beam used in the detection of the azimuthal direction of the target.

5. The radar device according to claim 2,
wherein the azimuthal direction detection device detects the final azimuthal direction of the target by adding the azimuthal direction of the target detected from the phase difference or amplitude difference and the azimuthal direction of transmission beam used in the detection of the azimuthal direction of the target.

* * * * *